(12) United States Patent
Yun et al.

(10) Patent No.: US 12,509,067 B2
(45) Date of Patent: Dec. 30, 2025

(54) VEHICLE FOR PERFORMING MINIMUM RISK MANEUVER AND METHOD OF OPERATING THE VEHICLE

(71) Applicants: Hyundai Motor Company, Seoul (KR); Kia Corporation, Seoul (KR)

(72) Inventors: Cheol Hwan Yun, Seoul (KR); Jong Sung Park, Hwaseong-si (KR); Yong Bin Min, Busan (KR); Chan Jong Jang, Daegu (KR); Bong Sob Song, Seongnam-si (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 192 days.

(21) Appl. No.: 18/305,500

(22) Filed: Apr. 24, 2023

(65) Prior Publication Data

US 2024/0001915 A1 Jan. 4, 2024

(30) Foreign Application Priority Data

Jun. 29, 2022 (KR) .......................... 10-2022-0079856

(51) Int. Cl.
*B60W 30/09* (2012.01)
*B60W 30/095* (2012.01)
*B60W 30/18* (2012.01)
*B60W 60/00* (2020.01)

(52) U.S. Cl.
CPC ........ *B60W 30/09* (2013.01); *B60W 30/0956* (2013.01); *B60W 30/18163* (2013.01); *B60W 60/0015* (2020.02); *B60W 2552/10* (2020.02); *B60W 2554/802* (2020.02)

(58) Field of Classification Search
CPC ............ B60W 30/09; B60W 30/0956; B60W 30/18163; B60W 60/0015; B60W 2552/10; B60W 2554/802; B60W 30/08; B60W 30/18109; B60W 30/181; B60W 40/02; B60W 40/10; B60W 50/14; B60W 60/0016; B60W 2050/0005; B60W 2050/146; B60W 2520/04
See application file for complete search history.

(56) References Cited

U.S. PATENT DOCUMENTS

2021/0229658 A1* 7/2021 Tsuji ................. B60W 60/0016
2022/0348227 A1* 11/2022 Foster .................... B60Q 1/507

OTHER PUBLICATIONS

Yu, Jing, and Feng Luo. "Fallback strategy for level 4+ automated driving system." 2019 IEEE Intelligent Transportation Systems Conference (ITSC). IEEE, 2019. (Year: 2019).*

* cited by examiner

Primary Examiner — Ramya P Burgess
Assistant Examiner — Ana D Thomas
(74) Attorney, Agent, or Firm — Slater Matsil, LLP

(57) ABSTRACT

An embodiment method for operating a vehicle includes monitoring a state of the vehicle, determining a type of a minimum risk maneuver based on the state of the vehicle, wherein the type of the minimum risk maneuver comprises a straight-ahead stopping type in which the vehicle stops after driving straight ahead only and a lane change stopping type in which the vehicle stops after changing a lane, and executing the determined type of the minimum risk maneuver.

19 Claims, 7 Drawing Sheets

| MRM STRATEGY | EMERGENCY STOP | STOP TO AVOID COLLISION | SHOULDER STOPPING AFTER CHANGING A LANE | | |
|---|---|---|---|---|---|
| CLASSIFICATION OF TYPES | TYPE 1 | TYPE 2 | TYPE 3 | TYPE 4 | TYPE 5 |
| | STRAIGHT-AHEAD STOPPING | ONE-LANE CHANGE STOPPING | FULL-SHOULDER STOPPING AFTER CHANGING A LANE | HALF-SHOULDER STOPPING AFTER CHANGING A LANE | SHOULDER STOPPING AFTER CHANGING TWO OR MORE LANES |
| EXAMPLE | | | | | |
| DETECTING A LANE | N/A | NECESSARY | NECESSARY | NECESSARY | NECESSARY |
| DETECTING A SHOULDER | N/A | N/A | NECESSARY | NECESSARY | NECESSARY |
| PERMITTING ACCELERATION | N/A | N/A | NECESSARY | NECESSARY | NECESSARY |

FIG. 3

| MRM STRATEGY | EMERGENCY STOP | STOP TO AVOID COLLISION | SHOULDER STOPPING AFTER CHANGING A LANE | | |
|---|---|---|---|---|---|
| CLASSIFICATION OF TYPES | TYPE 1 | TYPE 2 | TYPE 3 | TYPE 4 | TYPE 5 |
| | STRAIGHT-AHEAD STOPPING | ONE-LANE CHANGE STOPPING | FULL-SHOULDER STOPPING AFTER CHANGING A LANE | HALF-SHOULDER STOPPING AFTER CHANGING A LANE | SHOULDER STOPPING AFTER CHANGING TWO OR MORE LANES |
| EXAMPLE | 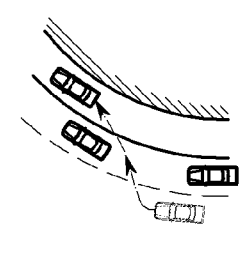 | 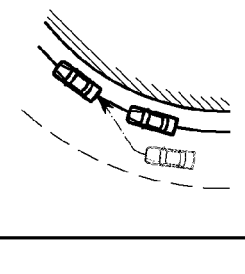 | 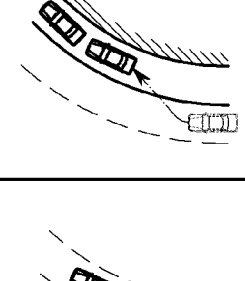 | 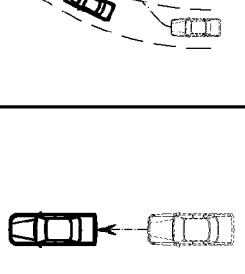 | |
| DETECTING A LANE | N/A | NECESSARY | NECESSARY | NECESSARY | NECESSARY |
| DETECTING A SHOULDER | N/A | N/A | NECESSARY | NECESSARY | NECESSARY |
| PERMITTING ACCELERATION | N/A | N/A | NECESSARY | NECESSARY | NECESSARY |

VEHICLE FOR PERFORMING MINIMUM RISK MANEUVER AND METHOD OF OPERATING THE VEHICLE

CROSS-REFERENCE TO RELATED APPLICATIONS

This application claims the benefit of Korean Patent Application No. 10-2022-0079856, filed on Jun. 29, 2022, which application is hereby incorporated herein by reference.

TECHNICAL FIELD

The present invention relates generally to a vehicle for performing a minimum risk maneuver and a method of operating the vehicle.

BACKGROUND

Recently, advanced driver assistance systems (ADAS) have been developed to assist drivers in driving. ADAS has multiple sub-technology classifications and can provide significant convenience to a driver. Such ADAS are also called an autonomous driving or ADS (Automated Driving System).

On the other hand, when the vehicle performs automated driving, an unexpected accident or event may occur, and the vehicle may be in a dangerous state if an appropriate response to minimize the risk of collision with a neighboring vehicle is not performed for such an event.

SUMMARY

Various embodiments relate to a method and a vehicle for performing a lane change for shoulder stopping when an unexpected accident or event occurs while driving on a highway and a minimum risk maneuver is performed.

Various embodiments of the present disclosure provide a method for changing a lane for shoulder stopping when a minimum risk maneuver is performed due to a malfunction during an automated drive of a vehicle.

In addition, various embodiments of the present disclosure provide a method for selecting a type of a lane change required for a vehicle to stop on a shoulder.

Technical problems solvable by embodiments of the present disclosure are not limited to what are mentioned above, and other technical problems not mentioned above may be precisely understood by those skilled in the art from the description provided below.

According to various embodiments, a vehicle may include a sensor detecting state information and neighboring environment information of the vehicle, a processor controlling an automated drive of the vehicle based on information coming from the sensor, and a controller controlling operation of the vehicle according to control of the processor.

The processor may monitor a state of the vehicle based on information coming from the sensor, determine a type of a minimum risk maneuver based on the state of the vehicle, and execute the determined type of the minimum risk maneuver by controlling the controller.

According to various embodiments of the present disclosure, a method for operating a vehicle may include monitoring a state of a vehicle, determining a type of a minimum risk maneuver based on the state of the vehicle, and executing the determined type of the minimum risk maneuver.

According to various embodiments of the present disclosure, the type of the minimum risk maneuver may include a type of straight-ahead stopping, which stops after driving straight ahead only, and a type of lane change stopping, which stops after changing a lane.

According to various embodiments of the present disclosure, the monitoring the state of the vehicle may include detecting a neighboring vehicle, and the determining the type of the minimum risk maneuver based on the state of the vehicle may include determining whether the neighboring vehicle exists within a region of interest or not and determining the type of straight-ahead stopping as the type of the minimum risk maneuver, when it is determined that the neighboring vehicle does not exist within the region of interest.

According to various embodiments of the present disclosure, the monitoring the state of the vehicle may further include detecting the number of lanes in a road on which the vehicle travels, and the determining the type of straight-ahead stopping as the type of the minimum risk maneuver, when it is determined that the neighboring vehicle does not exist within the region of interest may include determining the type of straight-ahead stopping as the type of the minimum risk maneuver, when the neighboring vehicle does not exist within the region of interest and the number of the lanes is equal to or less than a predetermined number.

According to various embodiments of the present disclosure, the monitoring the state of the vehicle may include detecting a neighboring vehicle, and the determining the type of the minimum risk maneuver based on the state of the vehicle includes determining whether a lane change is necessary or not and determining the type of stopping after a lane change as the type of the minimum risk maneuver when it is determined that a lane change is necessary.

According to various embodiments of the present disclosure, the determining whether a lane change is necessary or not may include determining that a lane change is necessary when a longitudinal distance between the vehicle and a front vehicle is less than a first minimum safety distance, a longitudinal distance between the vehicle and a right front driving vehicle is greater than a second minimum safety distance, and a longitudinal distance between the vehicle and a right rear driving vehicle is greater than a third minimum safe distance.

According to various embodiments of the present disclosure, the determining the type of the minimum risk maneuver based on the state of the vehicle may further include determining the type of straight-ahead stopping as the type of the minimum risk maneuver, when it is determined that a lane change is not necessary.

According to various embodiments of the present disclosure, the method for operating a vehicle may further include obtaining a request to execute a minimum risk maneuver function, and only when the request is obtained, the monitoring, the determining a type of the minimum risk maneuver, and the executing the determined type of the minimum risk maneuver may be performed.

According to various embodiments of the present disclosure, the method for operating a vehicle may further include determining whether the vehicle has completed executing the type of the minimum risk maneuver and has reached a minimum risk state or not and turning off an automated drive system when the vehicle reaches the minimum risk state.

According to various embodiments of the present disclosure, the monitoring the state of the vehicle may include detecting a neighboring vehicle, a lane, and a shoulder around the vehicle, the method for operating a vehicle may further include determining a risk of collision with the neighboring vehicle, and the determining the type of the minimum risk maneuver may include determining the type of the minimum risk maneuver based on the risk of collision and the state of the vehicle.

According to various embodiments of the present disclosure, the type of the minimum risk maneuver may include a type of straight-ahead stopping, which stops after driving straight ahead only, a type of one-lane change stopping, which stops after changing one lane, a type of full-shoulder stopping after changing a lane to a shoulder and then completely turning to and stopping on a shoulder, and a type of half-shoulder stopping after changing a lane, which stops across a shoulder after changing a lane to a shoulder.

According to various embodiments of the present disclosure, the determining the type of the minimum risk maneuver based on the state of the vehicle may include determining whether the neighboring vehicle exists within a region of interest or not, determining whether a next lane is a shoulder or not when the neighboring vehicle is within the region of interest, analyzing a shoulder condition and a route, when the next lane is the shoulder, determining a type of half-shoulder stopping after changing a lane as the type of the minimum risk maneuver, when it is determined that half-shoulder stopping is possible as a result of an analysis, determining a type of full-shoulder stopping after changing a lane as the type of the minimum risk maneuver, when it is determined that full-shoulder stopping is possible as a result of an analysis, and analyzing a shoulder condition and a route again after a predetermined time has elapsed, when it is determined that shoulder stopping is impossible as a result of an analysis.

According to various embodiments of the present disclosure, the determining the type of the minimum risk maneuver based on the state of the vehicle may include the determining whether the neighboring vehicle exists within the region of interest or not, the determining the type of straight-ahead stopping as the type of the minimum risk maneuver, when it is determined that the neighboring vehicle does not exist within the region of interest, determining whether a next lane is a shoulder or not, when the neighboring vehicle is within the region of interest, determining whether a lane change is necessary or not, when the next lane is not a shoulder, determining a type of straight-ahead stopping as the type of the minimum risk maneuver, when it is determined that a lane change is not necessary, determining a type of one-lane change stopping as the type of the minimum risk maneuver, when it is determined that a lane change is necessary, analyzing a shoulder condition and a route, when the next lane is the shoulder, determining a type of half-shoulder stopping after changing a lane as the type of the minimum risk maneuver, when it is determined that half-shoulder stopping is possible as a result of an analysis, determining a type of full-shoulder stopping after changing a lane as the type of the minimum risk maneuver, when it is determined that a full-shoulder stopping is possible as a result of an analysis, and determining whether the lane change is necessary or not again, when it is determined that shoulder stopping is impossible as a result of an analysis.

According to various embodiments of the present disclosure, the determining the type of the minimum risk maneuver based on the state of the vehicle may include generating a simple bird's eye view image including the detected neighboring vehicle, the lane and the shoulder, and the risk of collision, and determining a type of a minimum risk maneuver using an artificial intelligence that takes the generated simple bird's eye view image as an input.

According to various embodiments of the present disclosure, the generating the simple bird's eye view image may include changing and displaying brightness of the neighboring vehicle included in the simple bird's eye view image according to the collision risk to contain the collision risk.

According to various embodiments of the present disclosure, even if the vehicle is in danger due to an event occurring during an automated drive, a minimum risk maneuver capable of removing the risk may be performed. In particular, the vehicle may be converted into a minimum risk state out of danger, and driving stability of the vehicle is further increased, by automatically selecting a strategy for a lane change required during the minimum risk maneuver.

Advantageous effects that may be obtained from embodiments of the present disclosure are not limited to what are mentioned above, and other advantageous effects not mentioned may be precisely understood by those skilled in the art from the following description.

BRIEF DESCRIPTION OF THE DRAWINGS

FIG. 3 is a diagram illustrating types of changing a lane and a route for a minimum risk maneuver determined by a strategy determination unit according to various embodiments.

The same reference numerals may be used to denote the same or substantially the same elements regarding description of the drawings.

DETAILED DESCRIPTION OF ILLUSTRATIVE EMBODIMENTS

Hereinafter, various embodiments of the present disclosure will be described in further detail with reference to the accompanying drawings.

When a plurality of embodiments are explained in the present disclosure, each of the embodiments may be independent, and two or more embodiments may be combined and used unless they conflict with each other.

Figure 1:
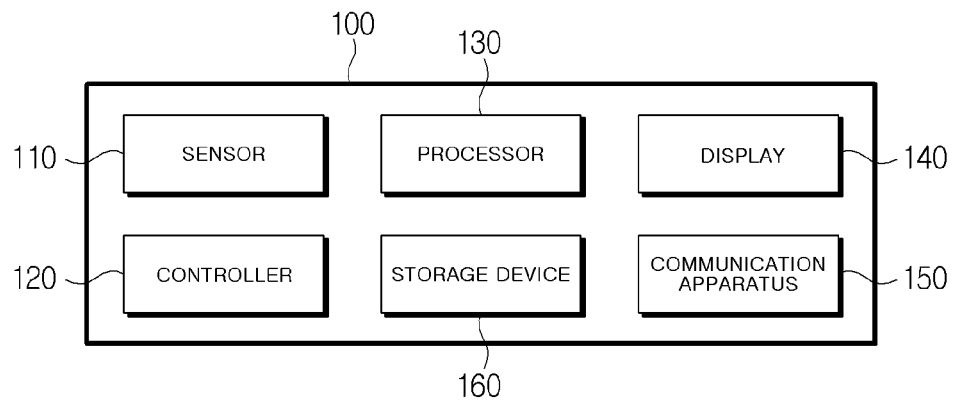
FIG. 1 is a diagram illustrating a conceptual organization of a vehicle according to various embodiments of the present disclosure.

FIG. 1 is a diagram illustrating a conceptual organization of a vehicle according to various embodiments of the present disclosure.

Referring to FIG. 1, a vehicle 100 may support an automated drive. According to embodiments, the vehicle 100 may perform steering, acceleration, braking, shifting, or parking without a driver's manipulation, and may drive under the driver's control when the driver intervenes. For example, the vehicle 100 may mean a vehicle capable of performing an automated drive according to a level 3 or higher according to the Society of Automation Engineers (SAE), but the present disclosure is not limited thereto.

For example, the automated drive explained in embodiments of the present disclosure may include at least one ADS function selected among a Pedestrian Detection and Collision Mitigation System (PDCMS), a Lane Change Decision Aid System (LCDAS), a Land Departure Warning System (LDWS), an Adaptive Cruise Control (ACC), a Lane Keeping Assistance System (LKAS), a Road Boundary Departure Prevention System (RBDPS), a Curve Speed Warning System (CSWS), a Forward Vehicle Collision Warning System (FVCWS), a Low Speed Following (LSF), and the like.

The vehicle 100 may include a sensor no, a controller 120, a processor 130, a display 140, a communication apparatus 150, and a storage device (e.g., a memory) 160.

The sensor no may sense an environment around the vehicle 100 and generate data related to the surroundings of the vehicle 100. According to embodiments, the sensor no may include at least one selected among a camera, a light detection and ranging (LIDAR) sensor, a radio detection and ranging (RADAR) sensor, and a location sensor.

The camera may photograph the surroundings of the vehicle 100 and may generate an image of the surroundings of the vehicle 100 according to the photographing result. The camera may detect the front, rear, and/or side of the vehicle 100 and may generate image data according to the detection result. For example, the camera may generate image data for other objects (e.g., other vehicles, people, objects, lanes, obstacles) located in the front, rear and/or on sides of the vehicle 100.

According to embodiments, the camera may include an image sensor, an image processor, and a camera MCU. For example, an image sensor may sense an image of a subject photographed through a lens, an image processor may receive the data from the image sensor and process the data, and the camera MCU may receive the data from the image processor.

The LIDAR sensor may detect the front, rear, and/or side of the vehicle 100 using light or a laser and may generate detection data according to the detection result. For example, the lidar sensor may detect or recognize other objects (e.g., other vehicles, people, objects, lanes, obstacles) located in the front, rear and/or on sides of the vehicle boo.

According to embodiments, the lidar sensor may include a laser transmission module, a laser detection module, a signal collection and processing module, and a data transmission/reception module, and the light source of the laser has a wavelength within a wavelength range of 250 nm to 11 μm or the light sources of the laser, capable of tuning a wavelength, may be used. In addition, the lidar sensor may be divided into a time of flight (TOF) method and a phase shift method depending on a signal modulation method.

The radar sensor may detect the front, rear and/or sides of the vehicle 100 using electromagnetic waves (or radio waves) and may generate detection data according to the detection result. For example, the radar sensor may detect or recognize other objects (e.g., other vehicles, people, objects, lanes, obstacles) located in the front, rear and/or on sides of the vehicle 100.

The radar sensor may detect an object up to 150 m ahead at a horizontal angle of 30 degrees using a Frequency Modulation Carrier Wave (FMCW) or a pulse carrier method. The radar sensor may process data generated according to the detection result, and such processing may include enlarging the sensed object located in front or focusing on the area of the object among the entire field of view.

The location sensor may measure the current location of the vehicle 100. According to embodiments, the location sensor may include a GPS sensor, and the GPS sensor may measure the location, speed, and current time of the vehicle boo using communication with a satellite. According to embodiments, the GPS sensor may measure the delay time of radio waves emitted from the satellite and obtain the location of the vehicle 100 from the distance from the orbit.

The controller 120 may control the operation of the vehicle 100 according to the control of the processor 130. According to embodiments, the controller 120 may control steering, driving, braking, and shifting of the vehicle 100. For example, the controller 120 may control each component for performing steering, driving, braking, and shifting of the vehicle 100.

The controller 120 may control the steering of the vehicle 100 according to the control of the processor 130. According to embodiments, the controller 120 may control a motor driven power steering system (MPDS) that drives the steering wheel. For example, when a vehicle collision is expected, the controller 120 may control the steering of the vehicle in a direction to avoid the collision or minimize damage.

The controller 120 may control the driving of the vehicle 100 according to the control of the processor 130. According to embodiments, the controller 120 may perform deceleration, acceleration of the vehicle 100, or turning on or off the engine. For example, the controller 120 may accelerate or decelerate according to the control of the processor 130 and may turn on/off the engine when the vehicle 100 starts or ends driving.

In addition, the controller 120 may control the driving of the vehicle 100 without the driver's control. For example, the controller 120 may perform an automated drive of the vehicle 100 under the control of the processor 130.

The controller 120 may control the brake of the vehicle 100 according to the control of the processor 130. According to embodiments, the controller 120 may control whether the brake of the vehicle 100 is operated or not and control the pedal effort of the brake. For example, the controller 120 may control to automatically apply the emergency brake when a collision is expected.

The processor 130 may control the overall operation of the vehicle 100. The processor 130 may be an electrical control unit (ECU) capable of integrally controlling components in the vehicle 100. For example, the processor 130 may include a central processing unit (CPU) or a microcontroller unit (MCU) capable of performing arithmetic processing. In addition, there may be at least one or more processors 130, and each processor 130 independently operates different functions to control the components in the vehicle 100, or according to another embodiment, the processors 130 may operate the elements of the vehicle together in an integrated manner while being in association with each other and exchanging data.

The processor 130 may perform a determination related to the control of the vehicle 100, and may control the controller 120 according to the determination result. According to embodiments, the processor 130 may receive data from the sensor 110 and generate a control command for controlling the controller 120 based on the received data. The processor 130 may transmit a control command to the controller 120. Also, the processor 130 may receive a driver's input or control and may control the controller 120 according to the driver's input.

Meanwhile, in the above description, it is explained in an assumption that the controller 120 and the processor 130 are separate components, but according to embodiments, the controller 120 and the processor 130 may be integrated as one component. For example, the controller 120 and the processor 130 may be integrated as one device and interwork with each other.

The display 140 may visually display information related to the vehicle 100. According to embodiments, the display 140 may provide various information related to the vehicle 100 to the driver of the vehicle 100 under the control of the processor 130. For example, the display 140 may visually display the current state of the vehicle 100 under the control of the processor 130.

The communication apparatus 150 may communicate with the outside of the vehicle 100. According to embodiments, the communication apparatus 150 may receive data from the outside of the vehicle 100 or transmit data to the outside of the vehicle 100 under the control of the processor 130. For example, the communication apparatus 150 may perform communication using a wireless communication protocol or a wired communication protocol.

For example, the vehicle 100 may communicate with another vehicle (vehicle to vehicle) or with an infrastructure (vehicle to infra) using the communication apparatus 150.

The storage device 160 may store programmed software and various configuration information required for the processor 130 to operate. The processor 130 may operate by reading a software code from the storage device 160 when the vehicle is started or the power is turned on. In addition, the processor 130 may temporarily store input data and output data generated during operation in the storage device 160. In addition, the storage device 160 may store information related to accident liability.

When an event such as an unexpected accident occurs while the vehicle having the conceptual organization of the vehicle as shown in FIG. 1 is performing an automated drive, it is necessary for the vehicle to stop by attempting a minimum risk maneuver or moving to a shoulder to stop the automated drive function of the vehicle in order to minimize the risk of collision with neighboring vehicles.

Embodiments of the present disclosure provide a method for efficiently and safely performing a lane change when a lane change is required among a minimum risk maneuver that an automated vehicle can attempt.

Figure 2:
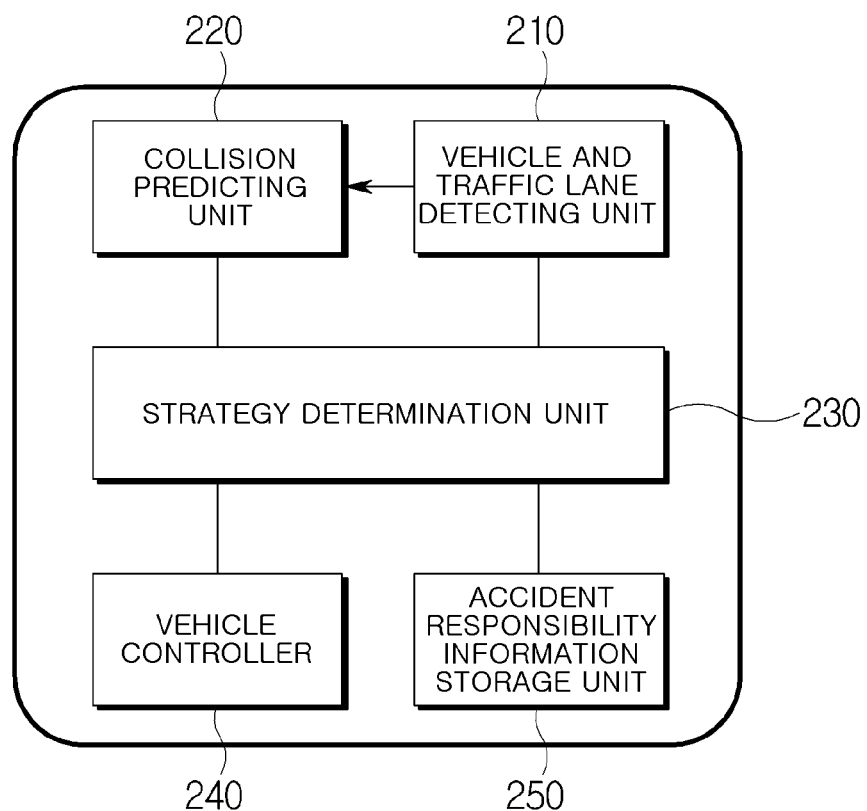
FIG. 2 is a diagram illustrating functional blocks to determine a strategy for changing a lane and a route required by a minimum risk maneuver of a vehicle.

FIG. 2 is a diagram illustrating functional blocks to determine a strategy for changing a lane and a route required by a minimum risk maneuver of a vehicle.

According to an embodiment, the functional blocks of FIG. 2 may be performed by the processor 130 of FIG. 1, but each of the functional blocks may be performed by different processors.

Referring to FIG. 2, the functional blocks for determining a strategy for a vehicle lane change and route setting may include a vehicle and traffic lane detecting unit 210, a collision predicting unit 220, and a strategy determination unit 230. In addition, a vehicle controller 240 and an accident responsibility information storage unit 250 may be further added thereto.

The vehicle and traffic lane detecting unit 210 may combine information acquired through a camera, a radar, and a sensor attached to the vehicle, such as a lidar sensor, a navigation, or the communication apparatus 150, thereby obtaining information detected in the vicinity of the vehicle wo such as surrounding vehicle information, lane information, and shoulder information. According to an embodiment, the vehicle and traffic lane detecting unit 210 uses a conventional image processing technique based on surrounding environment information acquired using a sensor and the like to obtain surrounding vehicle information, road information, lane information, and shoulder information. In another embodiment, the vehicle and traffic lane detecting unit 210 may acquire information about neighboring vehicles, road information, lane information, and shoulder information using artificial intelligence learned based on surrounding environment information acquired using a sensor or the like.

The collision predicting unit 220 may predict whether a vehicle will collide or not based on information on neighboring vehicles and lane information obtained by the vehicle and traffic lane detecting unit 210. According to an embodiment, the collision predicting unit 220 may determine whether there will be a collision between a neighboring vehicle and the host vehicle based on artificial intelligence. Additionally, the collision predicting unit 220 may predict and output information on probability of the collision rather than information on a collision. According to an embodiment, the collision predicting unit 220 may output the collision probability as one of values ranging from 0 to 255. Here, 255 may correspond to a case where the probability of collision is 100% and 0 may correspond to a case where the probability of collision is 0%.

The strategy determination unit 230 may set a strategy of a lane change and route setting in the process of performing the minimum risk maneuver by comprehensively using information from the collision predicting unit 220 and the vehicle and traffic lane detecting unit 210.

The vehicle controller 240 may generate a control command for causing the controller 120 to perform longitudinal and lateral direction control for a lane change based on the strategy selected by the strategy determination unit 230.

The accident responsibility information storage unit 250 may calculate and store accident responsibility information for a case in which a collision occurs in the lane change process at the time the lane change starts, or may temporarily store input and output data generated while determining the strategy for a lane change and route setting, or during the process of performing the minimum risk maneuver according to the selected strategy, for example, vehicle performance information or state information, or data for determining a strategy for a lane change in the storage device 160.

FIG. 3 is a diagram illustrating types of changing a lane and a route for a minimum risk maneuver determined by a strategy determination unit 230 according to various embodiments.

Referring to FIG. 3, the strategy determination unit 230 may include a type of straight-ahead stopping after driving straight ahead only and a type of lane change stopping, which stops after changing a lane, as types of a minimum risk maneuver. More specifically, the strategy determination unit 230 may select one among a straight-ahead stopping (type 1), a one-lane change stopping (type 2), a full-shoulder stopping after changing a lane (type 3), and a half-shoulder stopping after changing a lane (type 4) as types of a minimum risk maneuver, and in addition, may select shoulder stopping after changing two or more lanes (type 5) as a type of a minimum risk maneuver.

A type of straight-ahead stopping (type 1) is a type of minimum risk maneuver that can be performed when the risk of collision with another vehicle is low, in a situation in which there is a vehicle abnormality in the absence of other vehicles, and the vehicle may come to a stop and the automated drive may end. The straight-ahead stopping (type 1) may be a type of a minimum risk maneuver that can be performed when the automated drive functions such as lane detection, shoulder detection, acceleration permit, and the like are broken or not used.

The one-lane change stopping (type 2) may be a type to decelerate and stop a vehicle after changing a lane once to the left or the right lane which is determined to be an uncrowded lane with no other vehicle travelling on the corresponding lane, which is to be selected when there is a probability of a collision with a front or other neighboring vehicle, even if the vehicle gradually decelerates and there is no shoulder therein. It may be preferable to limit a lane change to once, if it is appropriate not to allow re-acceleration when changing a lane to avoid a collision.

A one-lane change stopping (type 2) requires a lane detection function among automated drive functions, but functions such as shoulder detection and acceleration may not be used for this type.

Types 3 to 5 are cases in which other vehicles exist nearby and full shoulder or half-shoulder stopping is possible, and may be the types in which shoulder or half-shoulder stopping is performed after changing a lane to avoid a neighboring vehicle or obstacle. According to an embodiment, since the minimum risk maneuver function of an automated drive may be a function initiated in an emergency risk state, it may be desirable to refrain from changing a lane twice or more. In order to execute types 3 to 5 of a minimum risk maneuver, the automated drive functions such as lane detection, shoulder detection, and acceleration permit may be required.

Figure 4:
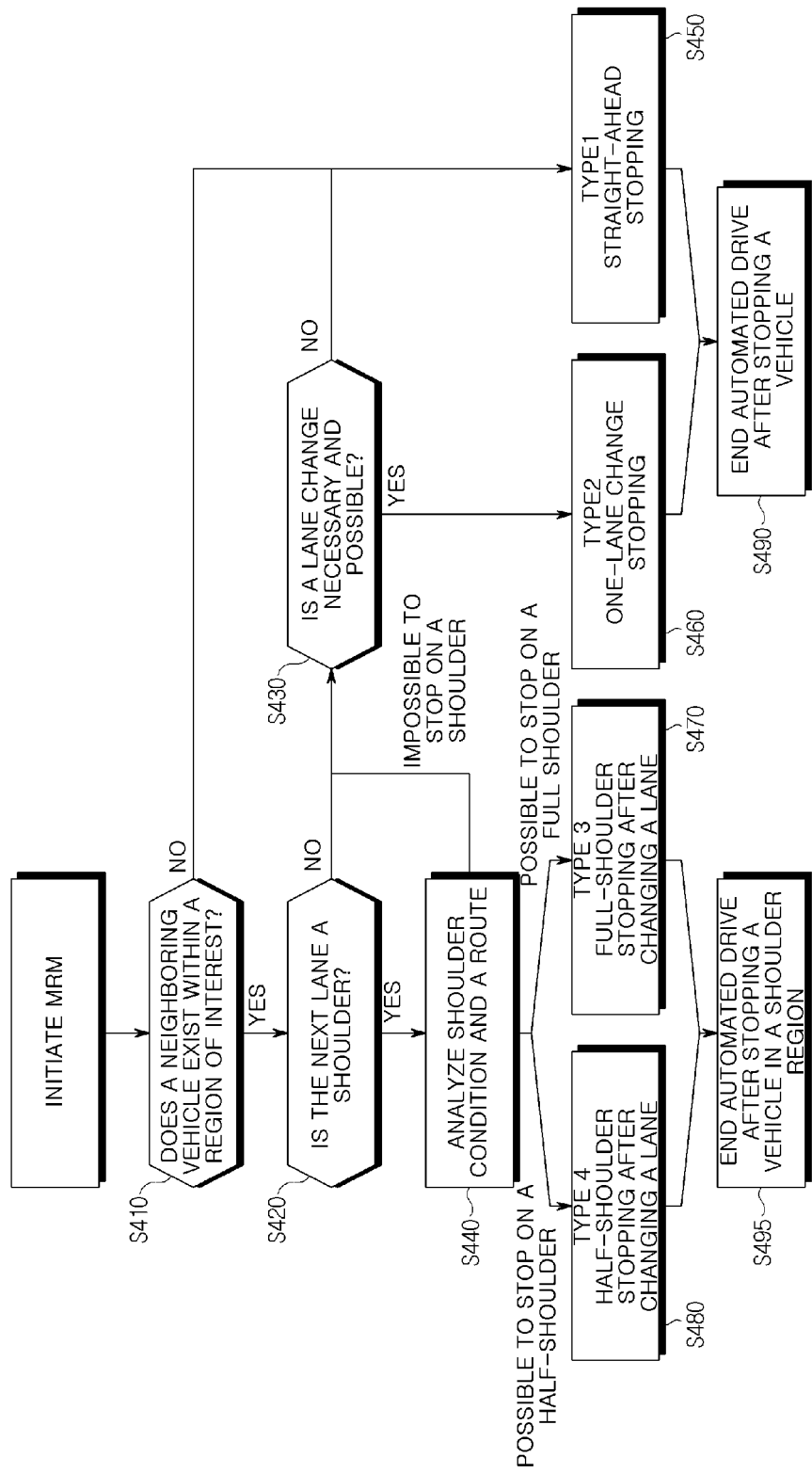
FIG. 4 is a flowchart illustrating steps used when a strategy determination unit selects types of changing a lane and a route for a minimum risk maneuver according to various embodiments.

FIG. 4 is a flowchart illustrating steps used when a strategy determination unit 230 selects types of changing a lane and a route for a minimum risk maneuver according to various embodiments.

Referring to FIG. 4, the strategy determination unit 230 of the vehicle 100 may determine whether a neighboring vehicle exists within a region of interest (ROI) or not in a step S410.

In the determination of the step S410, if there is no neighboring vehicle within the region of interest, the strategy determination unit 230 may select straight-ahead stopping (type 1) as the type of the minimum risk maneuver in a step S450.

Also, in a step S490, the corresponding strategy is transmitted to the vehicle controller 240, and the vehicle controller 240 of the vehicle 100 may control the controller 120 by generating a control command according to the selected straight-ahead stopping (type 1). Accordingly, the vehicle 100 may gradually decelerate while driving straight ahead and stop. Further, the vehicle 100 may end the automated drive after stopping.

According to another embodiment, in a step S410, the strategy determination unit 230 of the vehicle 100 further detects the number of lanes on the road on which the vehicle 100 travels. Only when the detected number of lanes is equal to or less than the predetermined number and no neighboring vehicle exists in the region of interest, the strategy determination unit 230 of the vehicle 100 may proceed to a step S450 and select the straight-ahead stopping (type 1) as the type of the minimum risk maneuver. When the detected number of lanes is greater than the predetermined number, the strategy determination unit 230 of the vehicle 100 may proceed to a step S420.

If it is determined in a step S41.0 that a neighboring vehicle exists within the ROI, the strategy determination unit 230 of the vehicle 100 may determine whether the next lane is a shoulder or not, in a step S420.

If it is determined in a step S420 that the next lane is not a shoulder, the strategy determination unit 230 may determine whether a lane change is necessary and possible or not in a step S430.

If it is determined that a lane change is not necessary and possible as a result of the determination in a step S430, the strategy determination unit 230 may select the straight-ahead stopping (type 1) as the type of the minimum risk maneuver in a step S450.

As a result of the determination in a step S430, if it is determined that a lane change is necessary and possible, the strategy determination unit 230 may select the one-lane change stopping (type 2) as the type of the minimum risk maneuver in a step S460.

In a step S490, the strategy determination unit 230 transmits the selected one-lane change stopping type (type 2) to the vehicle controller 240, and the vehicle controller 240 of the vehicle 100 generates a control command according to the received type of the minimum risk maneuver, thereby controlling the controller 120. Accordingly, the vehicle 100 may gradually decelerate and stop while driving in the changed lane after changing one lane. Then, the vehicle 100 may end the automated drive after stopping.

If it is determined again in a step S420 that the next lane is a shoulder, the strategy determination unit 230 may perform analysis on a shoulder condition and a route in a step S440. According to the embodiment, the strategy determination unit 230 may determine whether half-shoulder stopping is possible, full-shoulder stopping is possible, or shoulder stopping is impossible at the corresponding shoulder, or not.

If the strategy determination unit 230 determines that it is impossible to perform shoulder stopping in a step S440, the process may proceed to a step S430 to determine whether a lane change is necessary. In addition, based on the determination result of a step S430, the strategy determination unit 230 may select one among the straight-ahead stopping (type 1) and one-lane change stopping (type 2) as the type of the minimum risk maneuver.

If the strategy determination unit 230 determines that full-shoulder stopping is possible in a step S440, the strategy determination unit 230 may select the full-shoulder stopping after changing a lane (type 3) as the type of the minimum risk maneuver in a step S470.

If the strategy determination unit 230 determines that the half-shoulder stopping is possible in a step S440, the strategy determination unit 230 may select the half-shoulder stopping after changing a lane (type 4) as the type of the minimum risk maneuver in a step S480.

In addition, in a step S495, the type 3 or type 4 selected as the type of the minimum risk maneuver is transmitted to the vehicle controller 240, and the vehicle controller 240 of the vehicle wo may generate a control command according to the selected type, thereby controlling the controller 120.

Accordingly, the vehicle 100 may perform the minimum risk maneuver which is the half-shoulder stopping after changing a lane or the full-shoulder stopping after changing a lane. Further, the vehicle 100 may end the automated drive after stopping.

According to another embodiment, the strategy determination unit 230 of the vehicle 100 may proceed with the determination of a step S430 without determination of a step S420. In this case, the strategy determination unit 230 of the vehicle 100 may select one among the straight-ahead stopping (type 1) or lane change stopping (type 2) as the type of the minimum risk maneuver.

According to another embodiment, the strategy determination unit 230 of the vehicle 100 may first proceed with the determination of S430, and then proceed with the determination of S420. In this case, if the lane change is required and possible in the determination of S430, the strategy determination unit 230 of the vehicle wo may proceed with the determination of S420. As a result of the determination in S420, if the next lane is not a shoulder, one-lane change stopping (type 2) may be selected as the type of the minimum risk maneuver, and if the next lane is a shoulder, one among types 2, 3, and 4 may be selected as the type of the minimum risk maneuver based on the determination of S440.

In the flowchart of FIG. 4, the strategy determination unit 230 needs to determine whether a lane change is necessary in operations S430 and S440 and needs to determine whether a lane change is possible or not as well.

Figure 5:
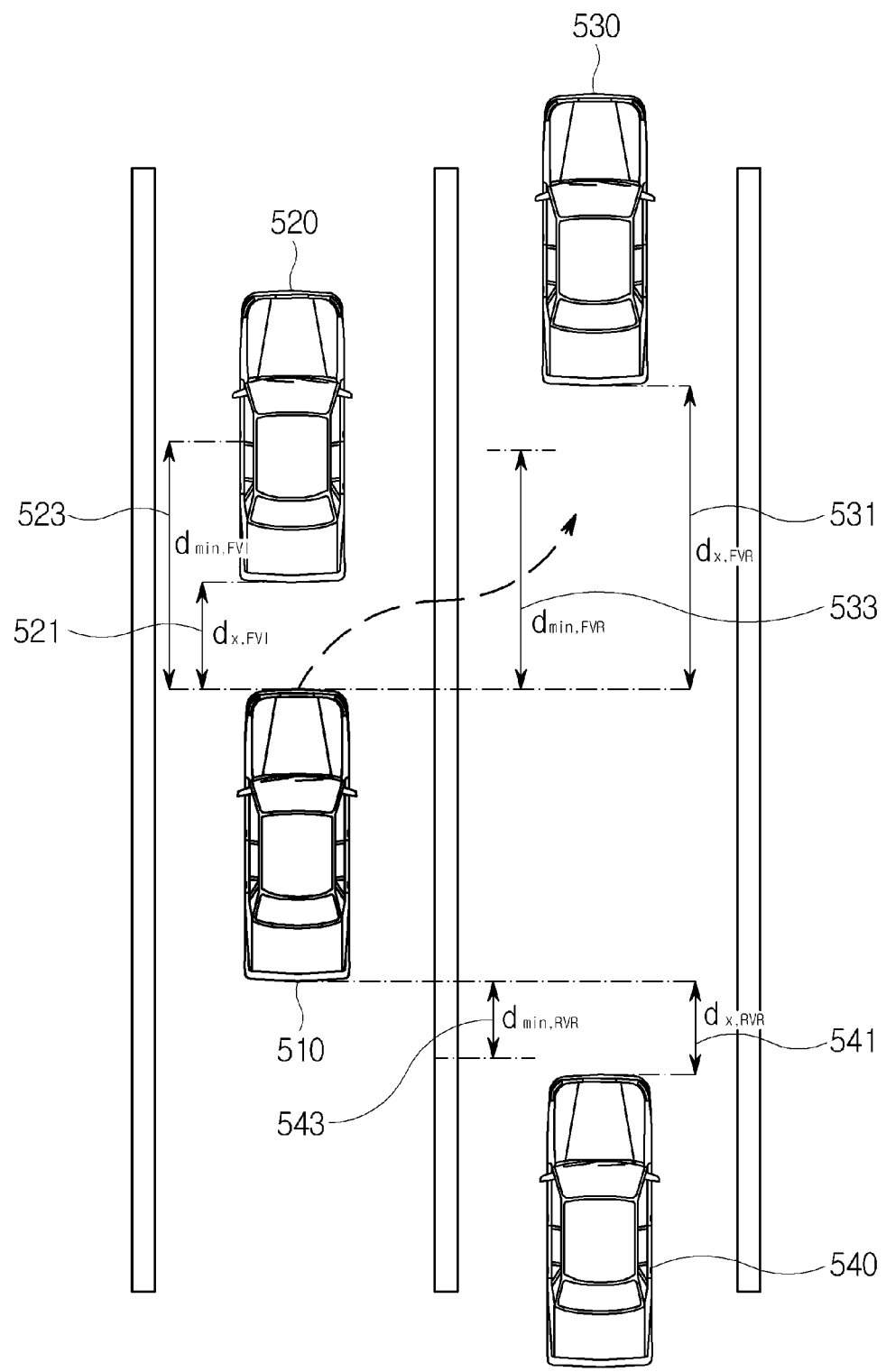
FIG. 5 is a diagram for explaining conditions by which a strategy determination unit determines whether a lane change is necessary or not, according to various embodiments.

FIG. 5 is a diagram for explaining conditions by which a strategy determination unit 230 determines whether a lane change is necessary or not, according to various embodiments.

Referring to FIG. 5, when the longitudinal distance ($d_{x,FVI}$) 521 between the front vehicle 520 and the host vehicle 510 on the lane on which the host vehicle 510 currently travels is shorter than the minimum safety distance ($d_{min,FVI}$) 523, a collision is unavoidable if the current driving lane is maintained, and accordingly, it may be determined that a lane change is necessary. That is, if the following Equation 1 is established, it may be determined that a lane change is necessary.

$$d_{min,FVI} = d_{x,FVI} \qquad \text{Equation 1}$$

In addition, even if the host vehicle 510 determines that a lane change is necessary, it is possible to change a lane in case changing to the right lane, only if the longitudinal distance ($d_{x,FVR}$) 531 to a vehicle driving on a right front side 530 is greater than the minimum safety distance ($d_{min,FVR}$) 533 and the longitudinal distance ($d_{x,RVR}$) 541 to a vehicle driving on a right rear side 540 is greater than the minimum safety distance ($d_{min,RVR}$) 543. That is, if the conditions of the following Equations 2 and 3 are satisfied, it is possible to change a lane.

$$d_{x,FVR} > d_{min,FVR} \qquad \text{Equation 2}$$

$$d_{x,RVR} = d_{min,RVR} \qquad \text{Equation 3}$$

In the case of the strategy of full-shoulder stopping after changing a lane or half-shoulder stopping after changing a lane as in Type 3 or 4 of FIG. 3, it may be determined that a lane change is required immediately, without requiring to determine probability of collision with the front vehicle in the lane where the host vehicle 510 travels as shown in Equation 1.

On the other hand, in the case of the shoulder, since there may be only a stationary vehicle or a low-speed vehicle, it may not be expected that a vehicle driving on a right rear side 540 is faster than the host vehicle 510. Therefore, the condition of Equation 3 may not be considered. However, it is necessary to consider the conditions of Equation 2 in consideration of the right front vehicle stopped on the shoulder or the right front vehicle traveling at low speed on the shoulder. That is, in the case of a strategy of full-shoulder stopping after changing a lane or half-shoulder stopping after changing a lane strategy as in Type 3 or 4 of FIG. 3, it is possible to execute a lane change by determining only the conditions of Equation 2.

When a strategy of shoulder stopping after changing two or more lanes is selected as in Type 5 of FIG. 3, if the conditions of Equations 1 to 3 are satisfied as described in FIG. 5, the lane change is performed, but the lane change may be done repeatedly until the vehicle reaches the last lane. When the last lane is reached, as described above, the lane change is executed to finally stop on the shoulder by determining the condition of Equation 2 only.

According to various embodiments of the present disclosure, the strategy determination unit 230 may select a type of a minimum risk maneuver based on artificial intelligence.

Figure 6:
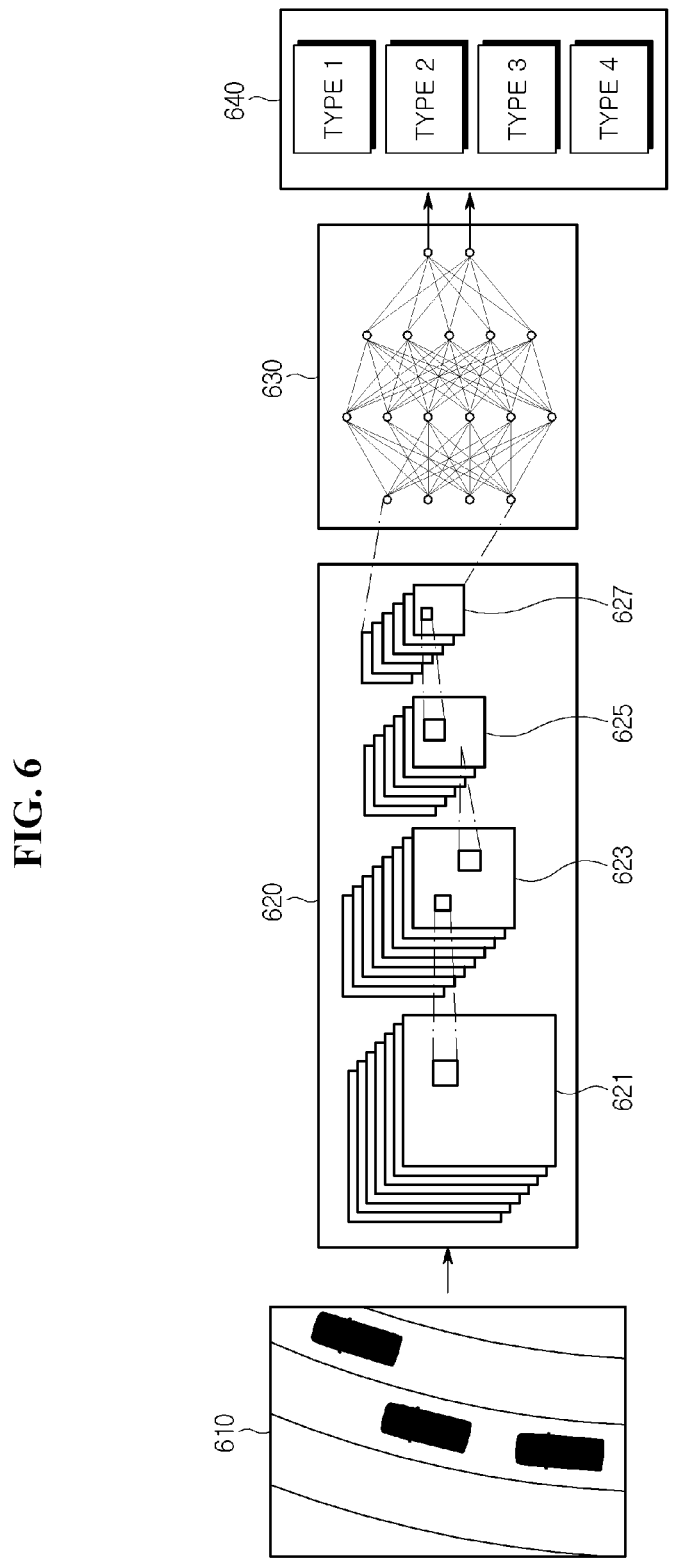
FIG. 6 is a diagram illustrating an example of artificial intelligence that may be used by a strategy determination unit according to various embodiments of the present disclosure.

FIG. 6 is a diagram illustrating an example of artificial intelligence that may be used by a strategy determination unit according to various embodiments of the present disclosure.

The artificial intelligence of FIG. 6 may be implemented as a program and executed by the processor 130. In addition, the example of implementing artificial intelligence of FIG. 6 is an embodiment, and the present disclosure is not limited thereto, and artificial intelligence of a different structure or other algorithm may be used.

The artificial intelligence of FIG. 6 shows an example of artificial intelligence in the structure of a convolutional neural network (CNN), which is a kind of deep neural network. Artificial intelligence based on a convolutional neural network may be effective in identifying structural spatial data such as images, videos, and strings. Convolutional neural networks may effectively recognize features with adjacent images while maintaining spatial information of images.

Referring to FIG. 6, artificial intelligence based on a convolutional neural network may include a feature extraction layer 620 and a classification layer 630. The feature extraction layer 620 may extract features of an image by synthesizing spatially nearby ones in the image using convolution.

The feature extraction layer 620 may be formed of a plurality of convolutional layers 621, 625 and pulling layers 623, 627 stacked. The convolutional layers 621, 625 may be the ones obtained by applying a filter to input data and then applying an activation function thereto. The convolutional layers 621, 625 may include a plurality of channels, and each channel may be the one to which each different filter and/or different activation function is applied. A result of the convolutional layers 621, 625 may be a feature map. The feature map may be data in two-dimensional matrix form. The pulling layers 623, 627 may receive the output data of the convolutional layers 621, 625, that is, a feature map as an input, and may be used to reduce the size of the output data or to emphasize specific data. The pulling layers 623, 627 may generate output data by applying functions of a max pooling to select the largest value among some data of the output data of the convolutional layers 621, 625, an average pooling to select an average value among some data of the output data of the convolutional layers 621, 625, and a min pooling to select the smallest value among some data of the output data of the convolutional layers 621, 625.

The feature maps generated through a series of the convolutional layers and the pooling layers may become smaller little by little. The final feature map generated through the last convolutional layer and pooling layer may be converted into a one-dimensional form and may be input to the classification layer 630. The classification layer 630 may be a fully connected artificial neural network structure. The number of input nodes of the classification layer 630 may be equal to a value obtained by multiplying the number of elements in the matrix of the final feature map and the number of channels.

The fully connected artificial neural network used in the classification layer 630 may include an input layer, an output layer, and selectively one or more hidden layers. Each layer may include one or more nodes corresponding to neurons of the neural network, and the artificial neural network may include synapses connecting nodes of one layer to nodes of another layer. In the artificial neural network, a node may receive input signals that are input through a synapse and may generate an output value on the basis of an activation function with respect to a weight for each of the input signals and a bias. The output value of each node may serve as an input signal to the subsequent layer through the synapse. An artificial neural network in which all nodes of one layer are connected to all nodes of the subsequent layer through synapses may be referred to as a fully connected artificial neural network.

The model parameter of the artificial neural network refers to a parameter determined through learning and may include a weight of a synapse connection of an artificial neural network of the classification layer 630, a bias of a neuron, and the like, and a size and kinds of filters applied in each convolutional layer 621, 625 of the feature extraction layer 620. The hyper parameter may refer to a parameter describing the structure of artificial intelligence itself, such as the number of convolutional layers of the feature extraction layer 620 and the number of hidden layers of the classification layer 630. In addition, a hyper parameter refers to a parameter that has to be set before performing learning in a machine learning algorithm, and may include a learning rate, a number of repetition times, a size of a mini-batch, an initialization function, and the like.

In addition to the above-described convolutional neural network, a recurrent neural network (RNN), a long short-term memory (LSTM) network, gated recurrent units (GRUs), or the like may be used as the deep neural network structure. The recurrent neural network is capable of performing classification and prediction by learning sequential data and is a structure that has a recurrent structure therein and learning at the past time is multiplied by a weight and a result thereof is reflected to current learning. Accordingly, the current output result is influenced by the output result from the past time, and the hidden layer performs a type of memory function. The recurrent neural network may be used for performing machine translation by analyzing speech waveforms, for generating text by understanding the components before and after the sentence of text, or for speech recognition.

An objective of performing learning for an artificial neural network is to determine a model parameter that minimizes a loss function. The loss function may be used as an index for determining an optimum model parameter in a learning process of the artificial neural network. In the case of the fully connected artificial neural network, a weight of each synapse may be determined by learning. In the case of the convolutional neural network, a filter of the convolutional layer for extracting the feature map may be determined by learning.

Machine learning may be classified into supervised learning, unsupervised learning, and reinforcement learning according to a learning method.

Supervised learning may refer to a method of performing learning for an artificial neural network where a label related to learning data is provided, and the label may refer to a right answer (or result value) that has to be estimated by the artificial neural network when the learning data is input to the artificial neural network. Unsupervised learning may refer to a method of performing learning for an artificial neural network where a label related to learning data is not provided. Reinforcement learning may refer to a learning method performing learning so as to select, by an agent defined under a certain environment, an action or an order thereof such that an accumulated reward in each state is maximized.

The artificial intelligence illustrated in FIG. 6 uses images 610 generated based on information acquired from the vehicle and traffic lane detecting unit 210 and information on the probability of the collision acquired from the collision predicting unit 220 as an input, and may output one type among types of a minimum risk maneuver 640 illustrated in FIG. 3 as a selected type.

The image 610 being input into the artificial intelligence illustrated in FIG. 6 is not a simple image taken by a camera or an image sensor, but a simplified bird's eye view (SBEV) generated to include information on the probability of collision between the host vehicle and a neighboring vehicle calculated by the collision predicting unit 220 based on the information on neighboring vehicles and lane detection and shoulder detection acquired from the vehicle and traffic lane detecting unit 210. Therefore, an image containing much more information than an image of a case to simply input an image captured by a camera is input to the artificial intelligence, thereby improving the performance and efficiency of the artificial intelligence.

Figure 7:
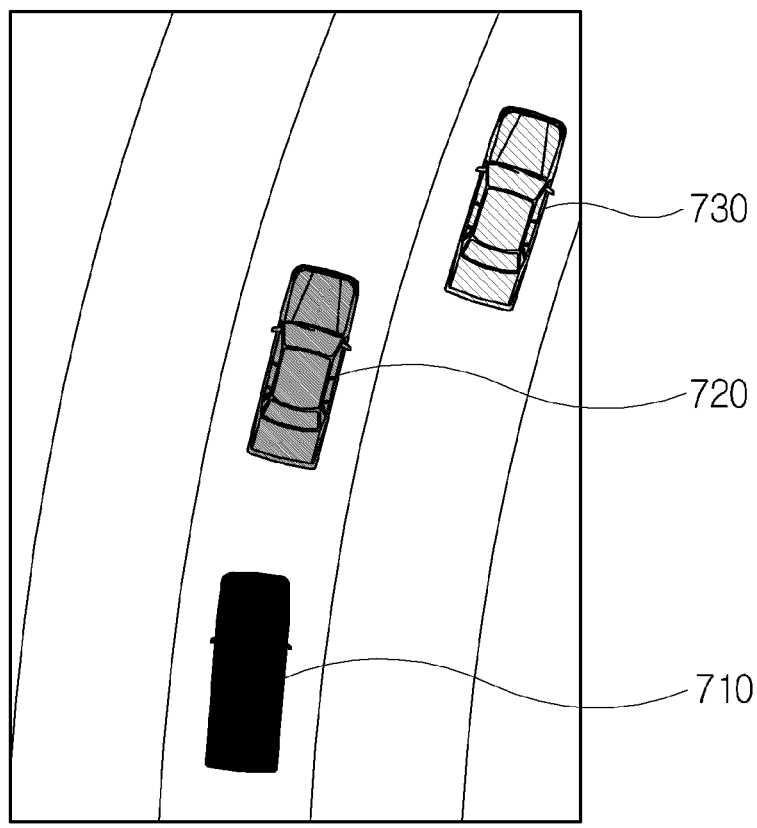
FIG. 7 is a diagram illustrating an example of an image generated to be input into artificial intelligence of a strategy determination unit according to various embodiments of the present disclosure.

FIG. 7 is a diagram illustrating an example of an image generated to be input into artificial intelligence of a strategy determination unit 230 according to various embodiments of the present disclosure.

Referring to FIG. 7, in order to make a simple bird's-eye view image, the host vehicle may be displayed as a square 710 in a first color or gray scale (e.g., black). In addition, neighboring vehicles within the ROI may be displayed as squares 720 and 730 in a second color or gray scale (e.g., a dark gray-) and a third color or gray scale (e.g., a little brighter gray). In this case, although the neighboring vehicle is displayed in the second color, the image may be displayed with different brightness depending on the probability of collision. According to an embodiment, all neighboring vehicles may not be displayed in the second color. For example, a neighboring vehicle having a collision probability smaller than a predetermined value may be displayed in the first color which is the same color as the host vehicle. On the other hand, if the collision probability is greater than a predetermined value, the neighboring vehicle may be displayed in the second color. In this case, the brightness of the neighboring vehicles displayed in the second color may vary according to the degree of the collision probability. In the above example, colors are used, but the neighboring vehicle and the host vehicle may be distinguished by a pattern or the like instead of the color. That is, the host vehicle may be displayed as a white square without any pattern therein, and the neighboring vehicle may be displayed as a square with a certain pattern. In this case, depending on the degree of the collision probability, it is possible to display the pattern to have increased spacing or density.

Figure 8:
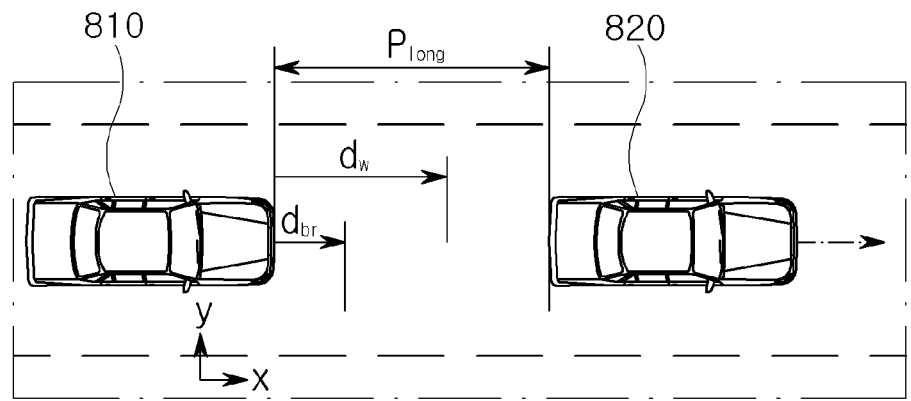
FIG. 8 is a diagram for explaining an example of calculating a risk of collision by a collision predicting unit according to various embodiments of the present disclosure.

FIG. 8 is a diagram for explaining an example of calculating a risk of collision by a collision predicting unit 220 according to various embodiments of the present disclosure.

Referring to FIG. 8, the risk of collision between the front vehicle 820 and the rear vehicle 810 may be calculated. Here, the host vehicle may be the front vehicle 820 or the rear vehicle 810.

First, the expected collision time (time to collision, TTC) may be calculated by using the following Equation 4.

$$TTC = \frac{P_{long}}{v_{rel}} \qquad \text{Equation 4}$$

Here, $P_{long}$ may represent the longitudinal distance between the rear vehicle 810 and the front vehicle 820 as shown in FIG. 8, and $v_{rel}$ may represent the longitudinal relative velocity between the rear vehicle 810 and the front vehicle 820. Since collision risk calculation is performed by the host vehicle, $v_{rel}$ may represent the longitudinal relative velocity of the neighboring vehicles with respect to the host vehicle.

In addition, a warning index (xp) may be calculated by using Equation 5.

$$x_p = \frac{P_{long} - d_{br}}{d_w - d_{br}} \qquad \text{Equation 5}$$

As shown in FIG. 8, $P_{long}$ represents the longitudinal distance between the rear vehicle 810 and the front vehicle 820, $d_{br}$ represents a breaking-critical distance until the vehicle stops when the vehicle moves with constant acceleration at maximum deceleration, and $d_w$ is a warning-critical distance considering the reaction time that it takes until the driver steps on a brake in $d_{br}$.

$d_{br}$ may be calculated using the following Equation 6, and $d_w$ may be calculated using the following Equation 7.

$$d_{br} = v_{rel} \cdot t_{brake} - \frac{v_{rel}^2}{2a_{x,max}} \qquad \text{Equation 6}$$

$$d_w = v_{rel} \cdot t_{thinking} + v_{rel} \cdot t_{brake} - \frac{v_{rel}^2}{2a_{x,max}} \qquad \text{Equation 7}$$

Here, $v_{rel}$ represents the longitudinal relative velocity between the rear vehicle 810 and the front vehicle 820, $t_{brake}$ is the system delay time of a hardware of the braking system, $t_{thinking}$ is the reaction time that it takes until the driver steps on the brake, and $a_{x,max}$ represents the maximum longitudinal deceleration of the vehicle.

When the driver of the rear vehicle 810 applies the brake and the rear vehicle 810 decelerates to the maximum, the rear vehicle 810 may go by $d_w$, and if $d_w$ is less than $P_{long}$, the warning index $x_p$ has a positive value and it may be determined that the current situation is safe. To the contrary, if $d_w$ is greater than $P_{long}$, the warning index ($x_p$) has a negative value, and it may be determined that there is a probability of collision.

The collision predicting unit 220 may calculate a longitudinal collision risk index ($I_{long}$) based on the following Equation 8.

$$I_{long} = \max\left(\frac{|x_{max} - x_p|}{|x_{max} - x_{th}|}, \frac{|TTC^{-1}|}{|TTC_{th}^{-1}|}\right) \qquad \text{Equation 8}$$

Here, $x_{max}$ is the maximum value of the warning index, $x_{th}$ is a threshold value of the warning index, and $TTC_{th}^{-1}$ is a threshold value of $TTC^{-1}$.

The time to lane crossing (TLC) in case the host vehicle changes a lane may be calculated using the following Equation 9.

$$TLC = \frac{y}{v_y} \qquad \text{Equation 9}$$

Here, y represents the lateral relative position of the neighboring vehicle, and $v_y$ represents the lateral relative velocity between the rear vehicle 810 and the front vehicle 820.

In addition, the collision predicting unit 220 may calculate a lateral collision risk index ($I_{lat}$) by using Equation 10.

$$I_{lat} = \min(I_{long}, 1) \cdot \min\left(\frac{TLC_{th}}{TLC}, 1\right) \qquad \text{Equation 10}$$

Here, $TLC_{th}$ may be a threshold value of a predetermined lane change time.

The lateral collision risk index has a value between 0 and 1, and the closer to 1, the more dangerous the current situation may be.

According to an embodiment, the threshold values included in the above equations may be set based on collision accident data or may be set based on a result of virtual accident data generated through a simulation test. According to an embodiment, $TTC_{th}^{-1}$ and $TLC_{th}$ may be 0.5.

The collision predicting unit 220 may generate an image with different brightness depending on the collision risk index as shown in FIG. 7, by reflecting the longitudinal collision risk index and/or the lateral collision risk index obtained based on the above-described equation.

Referring to FIG. 6 again, the artificial intelligence learns things based on a simple bird's eye view image as illustrated in FIG. 7, and the learned artificial intelligence may determine a type of the minimum risk maneuver based on the simple bird's eye view image, which is the same as the one illustrated in FIG. 7, and which is generated in the current state based on the detection result provided by the vehicle and traffic lane detecting unit 210 and the prediction result of the collision predicting unit 220.

Figure 9:
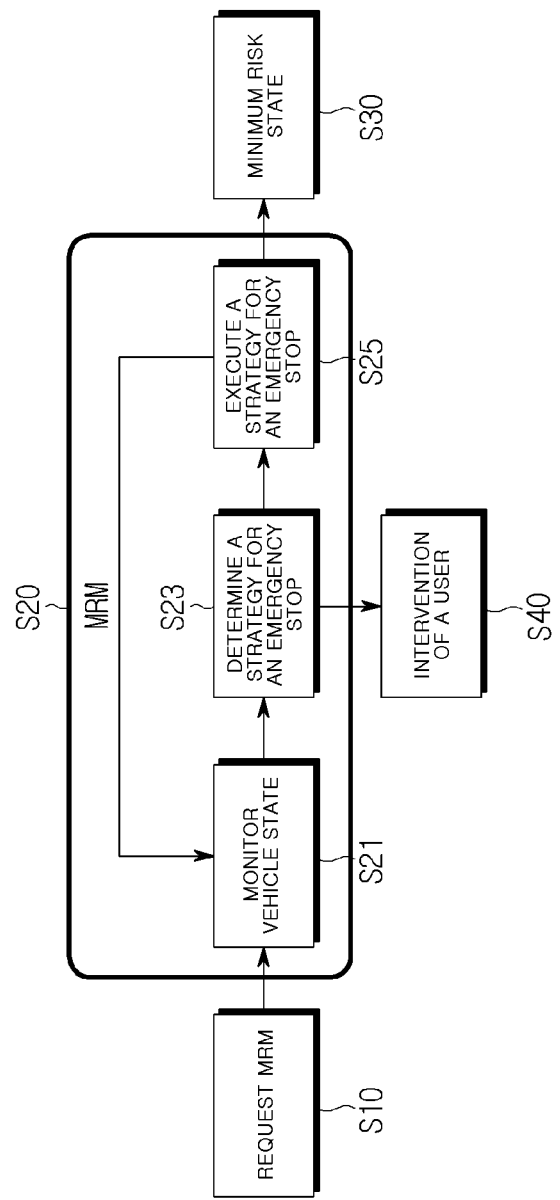
FIG. 9 is a flowchart illustrating operations required for performing a minimum risk maneuver of a vehicle according to various embodiments of the present disclosure.

FIG. 9 is a flowchart illustrating operations required for performing a minimum risk maneuver of a vehicle according to various embodiments of the present disclosure.

Referring to FIG. 9, in a step S10, the vehicle 100 may obtain a request for starting a minimum risk maneuver (MRM). According to embodiments, the processor 130 may generate a request for starting a minimum risk maneuver function when the vehicle 100 is started and the vehicle 100 starts to travel at a certain speed or more. Alternatively, the processor 130 may obtain information on the vehicle 100 and a state around the vehicle 100 and generate a request for a minimum risk maneuver based on the obtained state information. According to an embodiment, when it is determined that there is an abnormality in at least one of the vehicle states, a request for a minimum risk maneuver of the vehicle may be generated. Alternatively, the processor 130 may acquire a request for a minimum risk maneuver from the outside received through the communication apparatus 150 or the sensor no. The request for a minimum risk maneuver may mean an arbitrary command that causes the vehicle 100 to perform a minimum risk maneuver.

In a step S20, the vehicle 100 may execute the minimum risk maneuver function when there is a request for a minimum risk maneuver.

The minimum risk maneuver function may include a step of monitoring the state of the vehicle, a step of determining a type of a minimum risk maneuver, and a step of executing a minimum risk maneuver according to the determined type of the minimum risk maneuver.

In a step S21, the vehicle 100 may monitor the state of the vehicle 100. According to embodiments, the vehicle 100 may monitor the state of the minimum components and functions of the vehicle 100 necessary for driving a vehicle. According to an embodiment, the vehicle 100 may monitor whether braking control of the vehicle is possible, whether lateral control is possible, whether a lane can be detected, whether a shoulder can be detected, and the like by using the sensor no or the like.

In a step S23, the vehicle 100 may determine a type of a minimum risk maneuver of the vehicle based on the monitored information. The processor 130 of the vehicle 100 may determine a type of the minimum risk maneuver according to the flowchart shown in FIG. 4 or using artificial intelligence as shown in FIG. 6. According to an embodiment, a type of the minimum risk maneuver may include a straight-ahead stopping (type 1), one-lane change stopping (type 2), a full-shoulder stopping after changing a lane (type 3), and a half-shoulder stopping after changing a lane (type 4), as illustrated in FIG. 3.

In a step S25, the vehicle 100 may execute the determined type of the minimum risk maneuver.

In order to execute the determined type of the minimum risk maneuver, the vehicle 100 may execute at least one selected among stopping the vehicle, controlling steering of the vehicle, keeping the lane, providing visual, audible and tactile notifications, decelerating the vehicle, accelerating the vehicle, initiating/ending an automated drive, turning off the vehicle's ignition, transmitting an emergency signal, controlling an emergency light, warning of a speed reduction, controlling a brake light, transferring control authority to another passenger, and remote control. For example, the processor 130 of the vehicle 100 may transmit a control command corresponding to the determined type of the minimum risk maneuver to the controller 120, and the controller 120 may control the vehicle 100 according to the control command.

After the type of the minimum risk maneuver determined in a step S25 is executed, the vehicle is stopped and may be in the minimum risk state (step S30). When the vehicle 100 reaches the minimum risk state, the automated drive system may be turned off or the vehicle 100 may be turned off.

In addition, during the step S20, in a step S40, the vehicle 100 may ignore or stop the user's operation, interfere with the user's operation, and give priority to the operation enabled by the minimum risk maneuver.

In embodiments of the present disclosure, when the vehicle is in danger due to an event such as a failure occurring during an automated drive, the vehicle may perform the minimum risk maneuver function capable of minimizing the risk according to the above-described method. By doing so, the vehicle may escape from danger and may be converted into a state of minimum danger and the driving stability of the vehicle may be further increased.

What is claimed is:

1. A method for operating a vehicle, the method comprising:
    obtaining a request to execute a minimum risk maneuver function;
    monitoring a state of the vehicle;
    determining a type of a minimum risk maneuver based on the state of the vehicle, wherein the type of the minimum risk maneuver comprises a straight-ahead stopping type in which the vehicle stops after driving straight ahead only and a lane change stopping type in which the vehicle stops after changing a lane; and
    executing the determined type of the minimum risk maneuver,
    wherein monitoring the state of the vehicle comprises detecting a neighboring vehicle, and
    wherein determining the type of the minimum risk maneuver based on the state of the vehicle comprises:
        determining whether or not the neighboring vehicle exists within a region of interest,
        in response to a determination that the neighboring vehicle does not exist within the region of interest, determining the straight-ahead stopping type as the type of the minimum risk maneuver, and
    in response to a determination that the neighboring vehicle exists within the region of interest, determining the lane change stopping type as the type of the minimum risk maneuver.

2. The method according to claim 1, wherein:
    monitoring the state of the vehicle further comprises detecting a number of lanes in a road on which the vehicle travels; and
    determining the straight-ahead stopping type as the type of the minimum risk maneuver in response to the determination that the neighboring vehicle does not exist within the region of interest comprises determining the straight-ahead stopping type as the type of the minimum risk maneuver when the neighboring vehicle does not exist within the region of interest and the number of lanes is equal to or less than a predetermined number.

3. The method according to claim 1, wherein:
    determining the type of the minimum risk maneuver based on the state of the vehicle comprises:
        determining whether or not a lane change is necessary; and
        determining the lane change stopping type as the type of the minimum risk maneuver in response to a determination that the lane change is necessary, and
    determining whether or not the lane change is necessary comprises determining that the lane change is necessary when a longitudinal distance between the vehicle and a front vehicle is less than a first minimum safety distance, a longitudinal distance between the vehicle and a right front driving vehicle is greater than a second minimum safety distance, and a longitudinal distance between the vehicle and a right rear driving vehicle is greater than a third minimum safe distance.

4. The method according to claim 3, wherein determining the type of the minimum risk maneuver based on the state of the vehicle further comprises determining the straight-ahead stopping type as the type of the minimum risk maneuver in response to a determination that the lane change is not necessary.

5. The method according to claim 1, wherein monitoring the state of the vehicle, determining the type of the minimum risk maneuver, and executing the determined type of the minimum risk maneuver are performed only after obtaining the request to execute the minimum risk maneuver function.

6. The method according to claim 1, wherein:
monitoring the state of the vehicle comprises detecting the neighboring vehicle, the lane, and a shoulder adjacent to the vehicle;
the method further comprises:
determining a risk of collision with the neighboring vehicle; and
determining the type of the minimum risk maneuver comprises determining the type of the minimum risk maneuver based on the risk of collision and the state of the vehicle.

7. The method according to claim 6, wherein the lane change stopping type comprises:
a one-lane change stopping type in which the vehicle stops after changing one lane;
a full-shoulder stopping type in which the vehicle stops completely on the shoulder after changing the lane to the shoulder; and
a half-shoulder stopping type in which the vehicle stops across the shoulder after changing the lane to the shoulder.

8. The method according to claim 6, wherein determining the type of the minimum risk maneuver based on the state of the vehicle further comprises:
determining whether or not a next lane is the shoulder when the neighboring vehicle is within the region of interest;
analyzing a shoulder condition and a route when the next lane is the shoulder;
in response to a determination that a half-shoulder stopping is possible, determining a half-shoulder stopping type as the type of the minimum risk maneuver;
in response to a determination that a full-shoulder stopping is possible, determining a full-shoulder stopping type as the type of the minimum risk maneuver; and
in response to a determination that the shoulder stopping is not possible, analyzing the shoulder condition and the route again after a predetermined time has elapsed.

9. The method according to claim 6, wherein determining the type of the minimum risk maneuver based on the state of the vehicle comprises:
determining the straight-ahead stopping type as the type of the minimum risk maneuver when it is determined that the neighboring vehicle does not exist within the region of interest;
determining whether or not a next lane is the shoulder when the neighboring vehicle exists within the region of interest;
determining whether or not the a lane change is necessary when the next lane is not the shoulder;
determining the straight-ahead stopping type as the type of the minimum risk maneuver when it is determined that the lane change is not necessary;
determining a one-lane change stopping type as the type of the minimum risk maneuver when it is determined that the lane change is necessary;
analyzing a shoulder condition and a route when the next lane is the shoulder;
in response to a determination that a half-shoulder stopping is possible, determining a half-shoulder stopping type after changing the lane as the type of the minimum risk maneuver;
in response to a determination that a full-shoulder stopping is possible, determining a full-shoulder stopping type after changing the lane as the type of the minimum risk maneuver; and
in response to a determination that a shoulder stopping is impossible, determining whether or not the lane change is necessary again.

10. The method according to claim 6, wherein determining the type of the minimum risk maneuver based on the state of the vehicle comprises:
generating a simple bird's eye view image including the detected neighboring vehicle, the lane, the shoulder, and the risk of collision; and
determining the type of the minimum risk maneuver using an artificial intelligence that receives the generated simple bird's eye view image as an input.

11. The method according to claim 10, wherein generating the simple bird's eye view image comprises changing and displaying brightness of the neighboring vehicle included in the simple bird's eye view image according to the risk of collision to contain the risk of collision.

12. A vehicle comprising:
a sensor;
a processor configured to control an automated drive of the vehicle based on state information and neighboring environment information detected by the sensor; and
a controller configured to control operation of the vehicle according to control of the processor, wherein the processor is configured to:
obtain a request to execute a minimum risk maneuver function;
monitor a state of the vehicle based on the state information detected by the sensor;
determine a type of a minimum risk maneuver based on the state of the vehicle, wherein the type of the minimum risk maneuver comprises a straight-ahead stopping type in which the vehicle stops after driving straight ahead only and a lane change stopping type in which the vehicle stops after changing a lane; and
execute the determined type of the minimum risk maneuver by controlling the controller, and
wherein the processor is further configured to:
detect a neighboring vehicle of the vehicle,
determine whether or not the neighboring vehicle exists within a region of interest,
in response to a determination that the neighboring vehicle does not exist within the region of interest, determine the straight-ahead stopping type as the type of the minimum risk maneuver, and
in response to a determination that the neighboring vehicle exists within the region of interest, determine the lane change stopping type as the type of the minimum risk maneuver.

13. The vehicle according to claim 12, wherein the processor is configured to:
detect a number of lanes of a road on which the vehicle travels; and
determine the straight-ahead stopping type as the type of the minimum risk maneuver when the neighboring vehicle does not exist within the region of interest and the number of lanes is equal to or less than a predetermined number.

14. The vehicle according to claim 12, wherein the processor is further configured to:
determine whether or not a lane change is necessary;
determine that the lane change is necessary when a longitudinal distance between the vehicle and a front vehicle is less than a first minimum safety distance, a longitudinal distance between the vehicle and a right front driving vehicle is greater than a second minimum safety distance, and a longitudinal distance between the vehicle and a right rear driving vehicle is greater than a third minimum safe distance; and in response to a determination that the lane change is necessary, determine the lane change stopping type as the type of the minimum risk maneuver.

15. The vehicle according to claim 12, wherein the processor is further configured to:

in response to obtaining the request to execute the minimum risk maneuver function, determine the type of the minimum risk maneuver and execute the determined type of the minimum risk maneuver.

16. The vehicle according to claim 12, wherein the processor is configured to:

detect the neighboring vehicle, the lane, and a shoulder adjacent to the vehicle;

determine a risk of collision with the neighboring vehicle; and determine the type of the minimum risk maneuver based on the risk of collision and the state of the vehicle.

17. The vehicle according to claim 16, wherein the type of the minimum risk maneuver comprises:

a one-lane change stopping type in which the vehicle stops after changing one lane;

a full-shoulder stopping type in which the vehicle completely stops on the shoulder after changing the lane to the shoulder; and a half-shoulder stopping type in which the vehicle stops across the shoulder after changing the lane to the shoulder.

18. The vehicle according to claim 16, wherein the processor is configured to:

generate a simple bird's eye view image including the detected neighboring vehicle, the lane, the shoulder, and the risk of collision; and determine the type of the minimum risk maneuver using an artificial intelligence that receives the generated simple bird's eye view image as an input.

19. A method for operating a vehicle, the method comprising:

obtaining a request to execute a minimum risk maneuver function;

monitoring a state of the vehicle comprising detecting a neighboring vehicle, a lane, and a shoulder adjacent to the vehicle;

determining a type of a minimum risk maneuver based on the state of the vehicle, wherein the type of the minimum risk maneuver comprises a straight-ahead stopping type in which the vehicle stops after driving straight ahead only and a lane change stopping type in which the vehicle stops after changing the lane; and determining a risk of collision with the neighboring vehicle, wherein determining the type of the minimum risk maneuver comprises determining the type of the minimum risk maneuver based on the risk of collision and the state of the vehicle, wherein the lane change stopping type comprises:

a one-lane change stopping type in which the vehicle stops after changing one lane, a full-shoulder stopping type in which the vehicle stops completely on the shoulder after changing the lane to the shoulder, and a half-shoulder stopping type in which the vehicle stops across the shoulder after changing the lane to the shoulder, and executing the determined type of the minimum risk maneuver.

* * * * *